J. H. BERRY.
DEVICE FOR CUTTING GRASS.
APPLICATION FILED APR. 18, 1913.
1,090,267.
Patented Mar. 17, 1914.
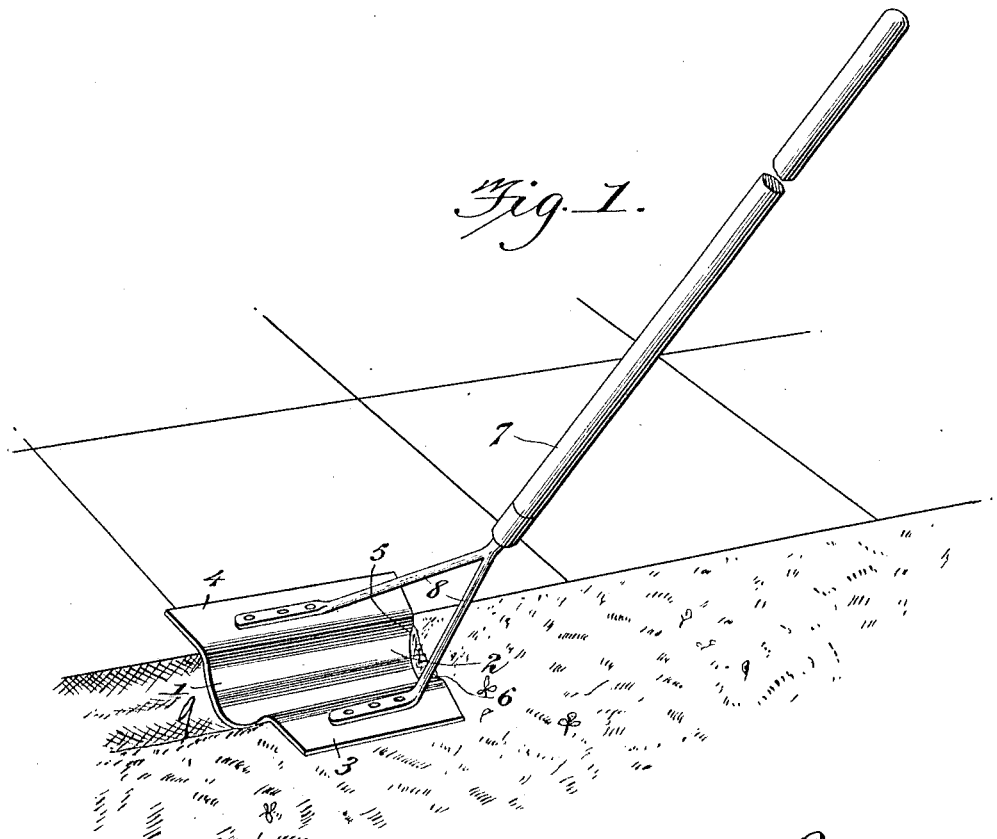
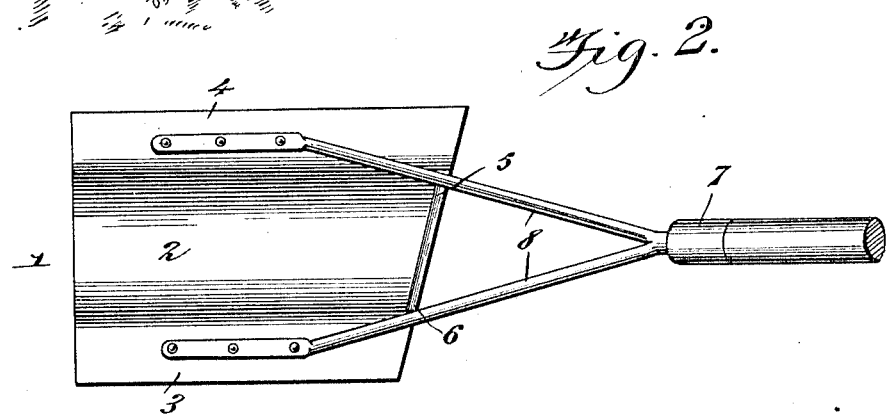
Witnesses
W. S. McDowell
D. W. Gould
Inventor
John H. Berry
By Victor J. Evans
Attorney

UNITED STATES PATENT OFFICE.

JOHN H. BERRY, OF NEWTON, ILLINOIS, ASSIGNOR OF ONE-FOURTH TO JAMES A. BOWLES, OF VILLA GROVE, ILLINOIS.

DEVICE FOR CUTTING GRASS.

1,090,267. Specification of Letters Patent. Patented Mar. 17, 1914.

Application filed April 18, 1913. Serial No. 762,029.

*To all whom it may concern:*

Be it known that I, JOHN H. BERRY, a citizen of the United States, residing at Newton, in the county of Jasper and State of Illinois, have invented new and useful Improvements in Devices for Cutting Grass, of which the following is a specification.

The invention relates to that class of implements used to trim grass or to cut ditches along the sides and edges of walks and drives, and is particularly directed to a hand operated implement which can be used under practically all conditions and which will be effective for securing an accurate and positive carrying out of the purpose designed.

The main object of the present invention is to form a blade to provide for the ready clearance of the weeds, grass and earth from the tool and to form integral with such blade a means adapted for coöperation with the walk to guide the tool in use and secure a uniform cutting action thereof.

The invention in its preferred form of details will be described in the following specification, reference being had particularly to the accompanying drawings, in which:—

Figure 1 represents a perspective view of the device showing the same in use. Fig. 2 is a plan of the device.

Referring particularly to the accompanying drawings, the improved tool comprises what may be termed a combined cutting and guiding member 1 made up of a single strip of material centrally disposed to form a U-shaped trough 2, the end sections of the material beyond the trough being disposed approximately on the same horizontal plane and providing what may be termed horizontal edges 3 and 4. In plan the side edges 5 and 6 of the strip, which form the cutting edges and are sharpened for this purpose, diverge relative to each other from one of the end edges of the tool for the purpose which will presently appear.

The handle 7 which may be of any desired form is connected to the combined guiding and cutting element by bars 8 which extend from the end of the handle and are terminally connected to the respective horizontal sections 3 and 4 of the strip.

In use the implement is drawn along adjacent the walk or trough way 9 with one or the other of the horizontal sections 3 or 4 resting upon the surface of the walk and forming a guide-way for the cutting depth of the tool and to insure a uniform cutting. The divergent cutting edges provide a shear cut in the use of which edges a more effective cutting action is had with less labor on the part of the operator. The tool is reversible in that either ledge 3 or 4 may serve as a supporting and guiding section and this adapts the tool for use on either side of the walk while provision of the duplicate cutting edges provide for it being operated by a push or pulling action, it being obvious that conditions might arise in which it would be necessary to use the implement as either right or left hand implement and to provide desired action by a pushing or pulling movement.

The material of which various parts are constructed is not important as I contemplate the use of any material which will secure the desired cutting effect and be sufficiently rigid to support the movement of the implement in operation.

What is claimed is:—

A sod trimmer comprising a plate having parallel side edges, a rear edge at right angles to the side edges and a forward edge at an inclination to the side edges other than a right angle, the longitudinal central portion of the plate being depressed to form a rounded trough, the side edges beyond the trough being in the same horizontal plane, and a handle having spaced terminals connected to the side edges of the plate, said handle rising from the plate to overlie the forward edge thereof.

In testimony whereof I affix my signature in presence of two witnesses.

JOHN H. BERRY.

Witnesses:
A. F. CALVIN,
H. T. PAYNE.

---

Copies of this patent may be obtained for five cents each, by addressing the "Commissioner of Patents, Washington, D. C."